July 16, 1968   E. ELLNER ET AL   3,392,895
FEED CONTROL FOR DISPENSING DEVICE
Filed April 23, 1965   4 Sheets-Sheet 1
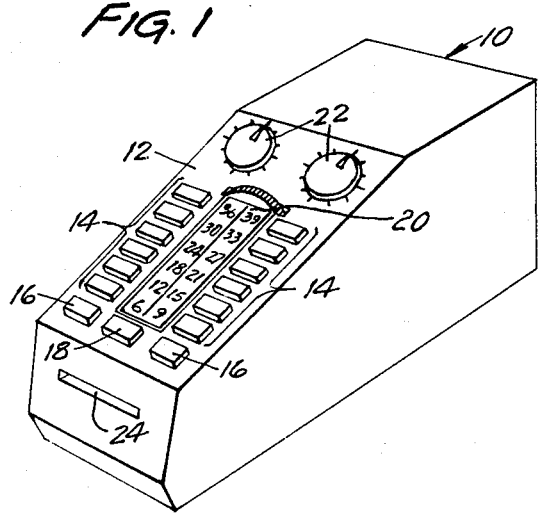
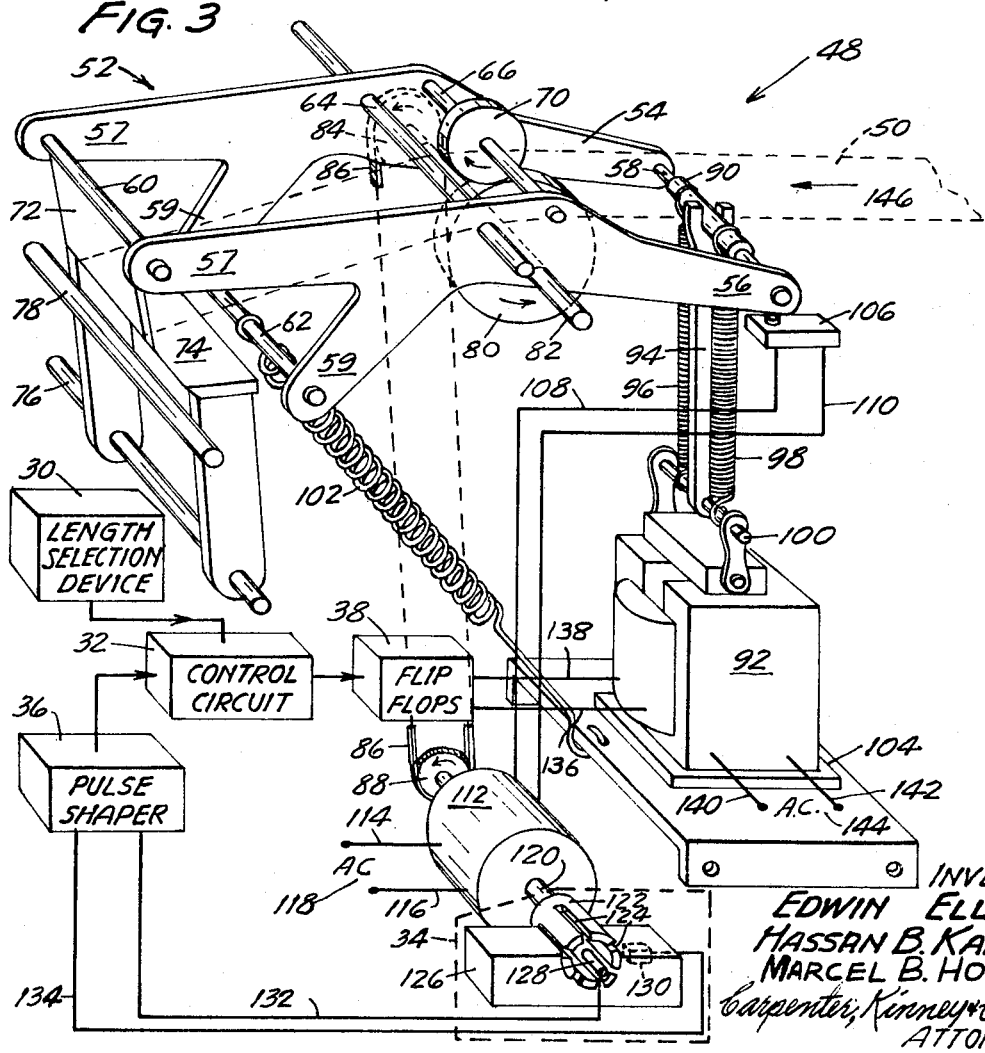
INVENTORS
EDWIN ELLNER
HASSAN B. KADAH
MARCEL B. HOSTE
Carpenter, Kinney & Boulter
ATTORNEYS July 16, 1968  E. ELLNER ET AL  3,392,895
FEED CONTROL FOR DISPENSING DEVICE
Filed April 23, 1965  4 Sheets-Sheet 2
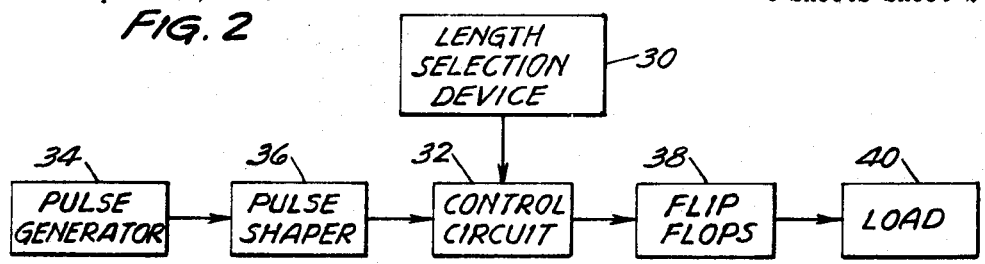
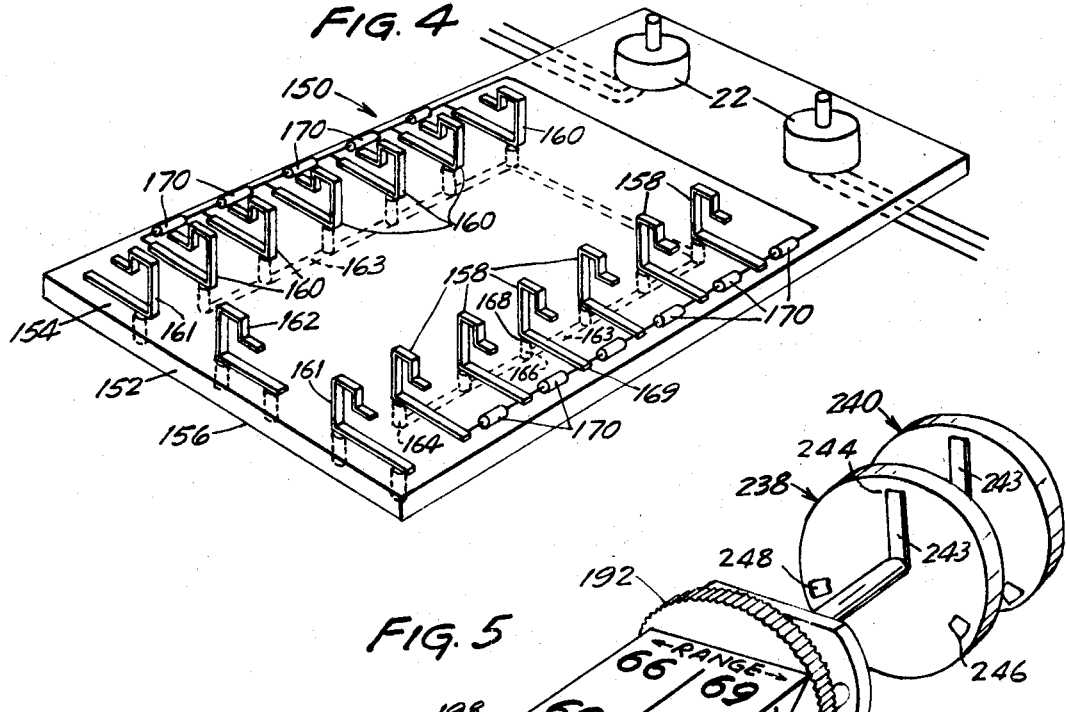
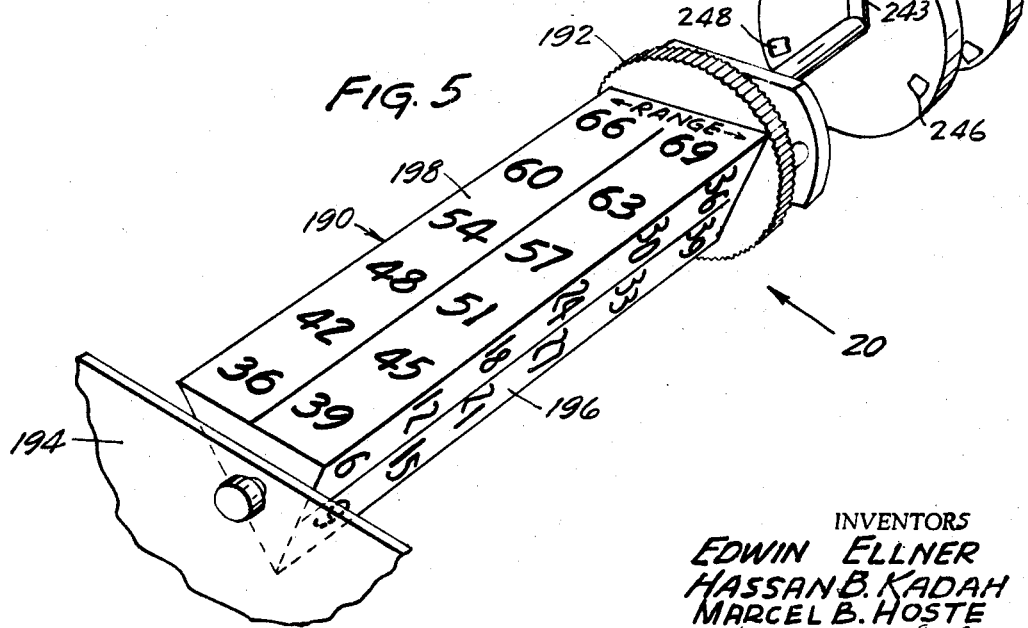
INVENTORS
EDWIN ELLNER
HASSAN B. KADAH
MARCEL B. HOSTE
Carpenter, Kinney + Boulter
ATTORNEYS July 16, 1968

E. ELLNER ET AL 3,392,895

FEED CONTROL FOR DISPENSING DEVICE

Filed April 23, 1965

INVENTORS
EDWIN ELLNER
HASSAN B. KADAH
MARCEL B. HOSTE
Carpenter, Kinney & Coulter
ATTORNEYS INVENTORS
EDWIN ELLNER
HASSAN B. KADAH
MARCEL B. HOSTE
Carpenter, Kinney & Boulter
ATTORNEYS

United States Patent Office

3,392,895
Patented July 16, 1968

3,392,895
FEED CONTROL FOR DISPENSING DEVICE
Edwin Ellner, Oxford Township, New Haven County,
Conn., and Hassan B. Kadah, Manlius, and Marcel B.
Hoste, Syracuse, N.Y., assignors to Minnesota Mining
and Manufacturing Company, St. Paul, Minn., a corporation of Delaware
Filed Apr. 23, 1965, Ser. No. 450,438
9 Claims. (Cl. 226—138)

ABSTRACT OF THE DISCLOSURE

A dispensing device for feeding measured lengths of strip material having a pulse generating device which is responsive to a strip material feeding means for generating pulses each of which represent an incremental length of strip material and a control circuit means for receiving generated pulses from the pulse generating means and for terminating operation of the strip material feeding means after a predetermined number of pulses have been received indicating that the selected length of strip material has been dispensed is shown.

---

This invention relates to a dispensing device for feeding measured lengths of strip material and more particularly to a tape dispenser having a pulse responsive control unit and a tape dispensing means wherein the pulse responsive control unit discontinues operation of the tape dispensing means after a predetermined length of tape has been dispensed.

In the prior art, it is known to use a control unit for controlling the operation of a strip material dispensing device to feed measured lengths of strip material. Such control units include either an electrical or mechanical timing means. The timing means in these units operate to control the length of time the dispensing device is operating to dispense a length of tape. The timing means include either a timing circuit which is variably set to operate a constant speed motor so selected lengths of strip material will be fed over the selected time interval or the constant speed motor is energized with the feeding means to rotate a mechanical timer which selectively resets switches indicating different lengths of strip material. In either device, after the strip material feeding means has operated for a given time interval to dispense the selected length of strip material, the timing means discontinues the operation the strip material feeding means.

This known strip material dispensing device has a disadvantage in that a motor or means for feeding the strip material at a nearly constant speed is required. The electrical or mechanical timing means converts a selected length of strip material into an appropriate operating time interval for operation of the strip material feeding means. Thus, these known dispensing devices require expensive constant speed motors to operate the feeding means and a drive motor or other feeding means which does not operate at constant speed e.g. a motor which requires a longer time interval to accelerate from stop to operating speed, is not useable. Additionally, the operation of the timing means must be reasonably accurate in its control of the strip material feeding means to insure feeding a length of strip material substantially equal to the selected length.

In other known types of strip material dispensing devices, the strip material feeding means is energized by individual pulses to dispense incremental lengths of strip material, the length being determined by the number of pulses received. The pulses may originate from either a rotatable dial mechanism capable of generating pulses in proportion to the arc through which it is selectively rotated, or from a rotatable cam-operated pulse generating mechanism which is capable of generating a certain number of pulses during the rotation thereof.

The disadvantage of the pulse energized type of strip material dispensing devices is that the number of pulses a mechanical pulse generating mechanism can produce in a time interval is limited and therefore the dispensing speed is limited. Further, these pulse driven devices require the production of high voltage pulses to drive the feed mechanism and therefore the circuitry must be capable of withstanding such operating voltages and is therefore more expensive than a system adapted to low voltage printed circuitry.

In another known type of strip material dispensing device, a plurality of resettable push buttons are utilized wherein each push button represents a predetermined length of strip material. When a push button is selectively depressed and set, it energizes a strip material feeding means. A reciprocable resetting member is driven, by the material feeding means (usually the movable pressure or idler roller) at a rate relative to the lengths of strip material dispensed, and mechanically resets the selected push button. When the push button is reset, the strip material feeding means is disabled and the reciprocable resetting member is returned to a start position. The length of strip material dispensed is determined by the distance in which the reciprocable resetting member is driven from the start position until it engages the set push button. The reciprocable resetting member may be driven either directly by the strip material feeding means or it may be driven by a pulse responsive stepping device intermittently stepped by pulses from a photosensing means which monitors the strip material being dispensed. In the latter type of de- device the strip material has discretely placed holes therein which operate the photosensing means and the distance between holes is indicative of an incremental length of strip material.

The disadvantages of the above described resettable push button devices are that the control mechanisms are mechanical fixed timing devices, and the push buttons must be arranged to permit engagement and resetting by the reciprocable resetting member. In all presently known devices of this type the selectivity of lengths which may be dispensed is limited. Additionally, the mechanical timing devices, when started, concurrently activate both a strip material feeding means and a solenoid, the solenoid providing means for placing an idler roller into engagement with the strip material to place it in contact with a driven roller of the strip feeding means. When the strip material is suddenly placed in contact with the driven roller, the strip material is rapidly accelerated from stop to dispensing speed. Thus strip material which may break or be elongated beyond its elastic limit when subjected to such immediate acceleration cannot be dispensed. Systems of this type also subject the drive means from the idler roller to the resetting member to shock loads requiring an increase in their physical size. Additionally, if the above mentioned photosensing pulse responsive stepping device is employed, it is necessary that the strip material, e.g. a strip of trading stamps, be preformed to have discretely placed holes therein.

One other known type of strip material dispensing device utilizes a rotatable lever member capable of being selectively rotated through a predetermined arc, which arc is representative of a selected length of tape. The lever member has a limit contact integral therewith, which limit contact is displaced a predetermined arcuate distance from a start position. When the dispenser is energized to dispense strip material, the strip material feeding means simultaneously drives a rotary trip member until the limit contact is mechanically engaged thereby. When the limit contact is engaged by the rotary trip member, the strip material feeding means is disabled and the rotary trip member is returned to start position. The length of strip material dispensed is determined by the distance the rotary trip member is driven from start position until it engages the limit contact. An alternate known arrangement of this type of device eliminates the rotary trip member by utilizing the strip material feeding means to directly drive the rotatable lever member back to the start position whereupon the limit contact engages a fixed stop member disabling the strip material feeding means.

The rotatable lever member dispensing device has the disadvantage in that the range or selected lengths of strip material which may be dispensed is limited and the device requires two manual operations to feed a length of strip material. The first operation is to manually set the lever member to the desired length, and the second operation is to depress a push button activating the dispenser to feed the predetermined length of strip material. When the dispenser is to sequentially feed several different lengths of strip material, it is inconvenient and time consuming to reset the lever member for each different length of strip material prior to depressing the push button associated therewith.

The strip material dispensing device of the present invention differs substantially from the prior known devices and avoids the disadvantages encountered with such devices.

The dispensing device of the present invention provides a novel combination of a strip material feeding mechanism and a pulse responsive control unit therefor to afford the accurate dispensing of selected lengths of material.

The dispensing device of the present invention provides an advantage over all the known devices of this type in that it produces and applies pulses produced upon operation of the strip feeding means such that when the drive motor is operated to dispense strip material, a pulse is produced and transmitted to the control unit which upon receiving a definite number of the pulses discontinues operation of the strip material feeding means resulting in a definite measured length of the strip material being dispensed.

The present invention provides a dispensing device wherein, before energization of the strip material feeding mechanism, said feeding mechanism is in driving contact with the strip material and any rotation of the feeding mechanism will dispense said material and produce a pulse or pulses representative of the incremental length of said material dispensed to eliminate the possibility of the feeding mechanism or the control unit operating independently of each other or before any material is dispensed.

The dispensing device provides a device wherein the strip material feeding means need not be operated at a constant speed. The elimination of a constant speed strip material feeding means also eliminates the need of a timing means to convert a time interval into a selected length of strip material, which time interval is equal to the time required for operating the constant speed strip material feeding means to feed the selected length of strip material.

In the dispensing device of the present invention the pulses are applied directly to the control circuit rather than to a pulse responsive strip material feeding means, and when a predetermined number of pulses have been received by the control circuit, it produces an output signal which discontinues operation of the strip material feeding means.

In this dispensing device, the maximum rate at which the strip material can be dispensed is determined by the operating speed of a driving motor and a tape feeding mechanism. The measuring of the strip material is accomplished electrically by accumulating pulse charges on a storage capacitor, which pulses originate from a pulse generator operatively connected to the driving motor. In this embodiment, a certain number of pulses are representative of a fixed length of strip material. Therefore, the driving motor is used both as a reference for measuring purposes and as the drive for a feeding mechanism which includes a drive roller, thereby providing accurate length measurement and uniform acceleration of the strip material from rest to operating speed as the motor is operated.

In this dispensing device, a control panel is provided which has a plurality of push buttons including: push buttons representative of predetermined lengths of strip material in a given range and the length represented by the buttons may be varied by a rotatable scale member; push buttons representative of variable lengths of strip material, the lengths being assigned by adjusting a variable length selector having a pointer and indicia indicating different lengths; and a push button representative of a random length of strip material, the length being determined by the length of time the push button is depressed; thus providing a versatile dispensing machine.

These and other features and advantages of the strip material dispensing device of the present invention will be more fully understood from the following detailed description which refers to the accompanying drawing wherein:

FIGURE 1 is an isometric view illustrating a tape dispensing device of the present invention;

FIGURE 2 is a block diagram of a pulse responsive control unit which controls the tape dispensing device of FIGURE 1;

FIGURE 3 is a diagrammatic view of a tape dispensing mechanism of the tape dispensing device of FIGURE 1;

FIGURE 4 is a diagrammatic view of the switches appearing on the control panel in FIGURE 1;

FIGURE 5 is a diagrammatic view of the rotatable scale member on the control panel in FIGURE 1;

FIGURES 6A and 6B are schematic diagrams of the pulse responsive control unit of FIGURE 2.

Figure 6B:
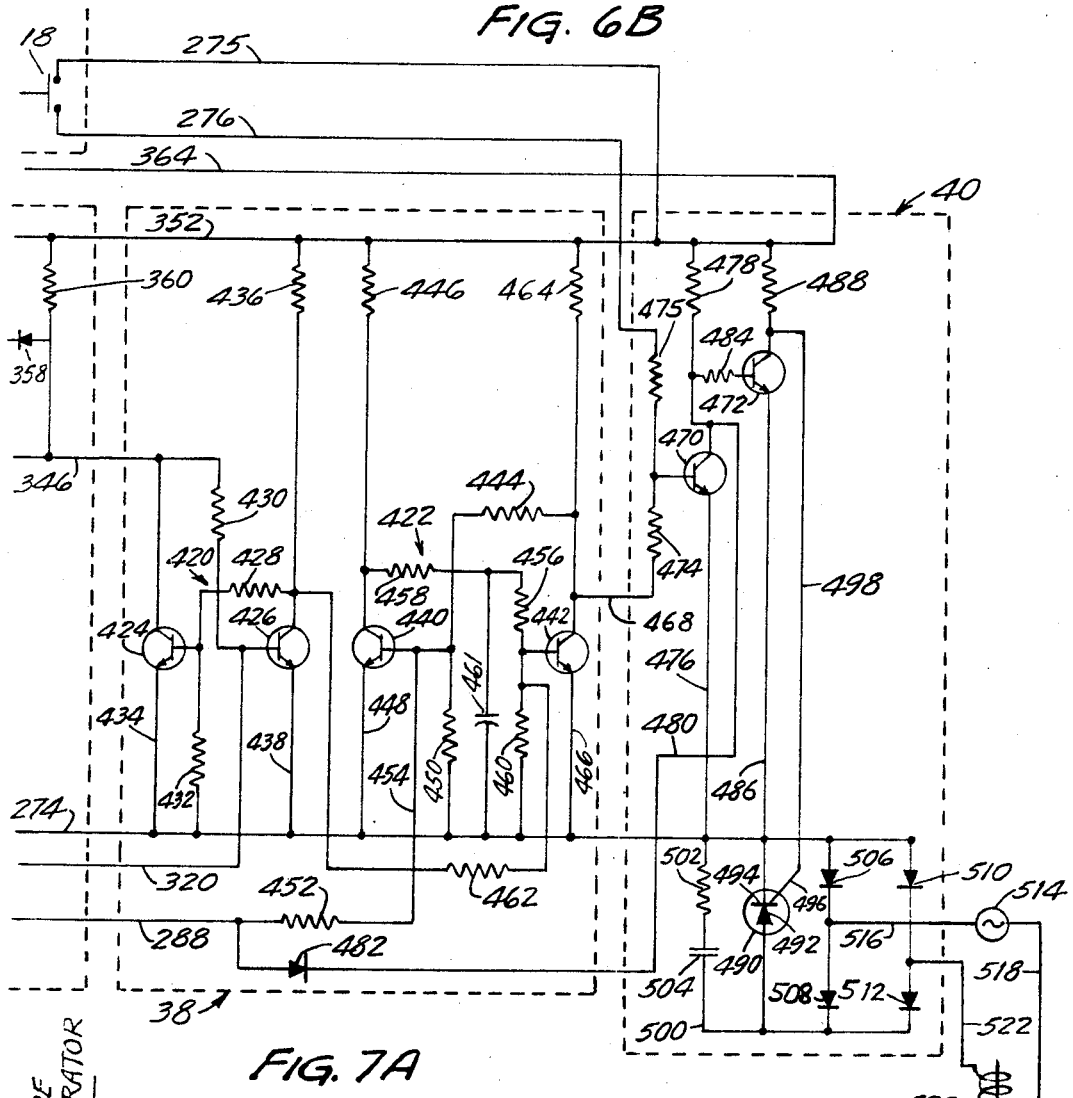

FIGURE 1 is an isometric view of a tape dispenser, shown generally as 10, having a control panel 12 upon which is arranged push buttons shown generally as 14, 16 and 18. The push buttons 14 are arranged in parallel rows and are each selectively operative to dispense a predetermined length of tape, the length being indicated by graphic symbols or numerals which appear in corresponding rows on a rotatable scale member 20 mounted on said panel adjacent the rows of push buttons 14. Upon rotational movement of scale member 20, a different predetermined tape length, as indicated by a different set of numerals associated with each button in the rows, is assigned to each push button 14. Each of the two variable length push buttons 16 has a rotatable length selector 22 associated therewith enabling selection of a fixed length of tape as indicated by the position of a pointer with respect to a dial each time the button 16 is depressed. A random push button 18 enables dispensing of a random length of tape, or energizes the tape feeding mechanism as long as the push button is depressed.

When a push button, of the 14 or 16 type is momentarily depressed, the tape dispensing device 10 dispenses a definite length of tape, through an opening 24 in the front wall of the device 10. Similarly, when the random push button 18 is depressed and released, a random length of tape is dispensed through the opening 24. The supply of tape is stored in roll form within the dispenser 10 in the conventional manner.

FIGURE 2 diagrammatically illustrates an electrical control means which actuates and controls the tape feeding mechanism upon a button being depressed to afford a predetermined operative cycle and comprising a length selection device 30, which includes the components associated with the panel 12 of FIGURE 1, and a pulse responsive control circuit 32. The control circuit 32 is conditioned by the length selection device 30 to receive a predetermined number of pulses. The pulses are generated by a pulse generator 34 operative upon operation of the tape dispensing mechanism. The pulses produced by the pulse generator 34 are shaped to be uniform in amplitude and duration by a pulse shaper 36. The pulse shaper 36 applies the pulses to the control circuit 32 of the control means. The control circuit 32, when conditioned by the length selection device 30, drives flip-flops 38, having a set and reset state, from reset state to set state energizing a load 40. The load 40 being a combination of components operates as a switch to energize an energizable element which actuates the tape dispensing mechanism of the dispenser. Control circuit 32, upon receiving a predetermined number of pulses from the pulse shaper 36, drives the flip-flops 38 back into reset state to de-energize the load 40 thereby discontinuing the tape dispensing operation, whereupon the selected length of tape is dispensed.

In FIGURE 3, a tape dispensing mechanism, shown generally as 48, feeds or dispenses strip material or tape 50 from a supply roll (not shown) under control of the pulse responsive control unit.

The tape dispensing mechanism 48 includes a yoke, indicated by the numeral 52, having two identical transversely spaced side plates 54 and 56. Each side plate has one end joined by a transversely extending rod 58. The other end of each side plate 54 and 56 is bifurcated to provide a first and second arm, the first arm 57 of each yoke side plate being joined by a bar 60 supporting a cutter knife 72 and the second arms 59 are joined by a transverse rod 62. Additionally, each side plate is joined by a shaft 64, extending through said side plates substantially at the balance point of the yoke 52, journalled therein or to the side frames of the dispenser to pivotally mount the yoke 52. A pressure roller support shaft 66 extends between the side plates 54 and 56 in spaced relation to the pivot shaft 64 and rotatably supports a suitable strip material pressure roller 70.

The cutter knife 72 extends between the side plates 54 and 56 and cooperates with a second knife edge formed on a cutter platform 74 positioned therebelow. The platform 74 is rotatably mounted on a cutter platform support 76 to permit the platform 74 to rest against a cutter platform stop 78, which stop extends beyond the ends of the cutter platform 74.

A drive roller 80 is rigidly, or drivingly connected to a drive shaft 82, which drive shaft has its ends suitably bearinged in the side frames of the tape dispenser. A sprocket wheel 84 is drivingly connected to the shaft 82 adjacent one end to drive the shaft and the drive roller 80. The sprocket wheel is rotated by a chain 86, which chain 86 is driven by a sprocket wheel 88 connected to the drive shaft 120 of a motor 112.

The transverse rod 58 rotatably supports a sleeve 90 which is located midway between the side plates 54 and 56 of the yoke 52. Spaced immediately below the sleeve 90 is a solenoid 92 and its associated control circuitry, hereinafter referred to as solenoid 92. A compression link 94 and a pair of tension springs 96 and 98 couple the sleeve 90 of yoke 52 to a linkage 100 affixed to the armature of the solenoid 92. The springs 96 and 98 each have a modulus of elasticity which together are sufficiently large to rotate the yoke 52 about pivot shaft 64 when the solenoid 92 is energized moving the linkage 100 in a direction to move the pressure roller 70 toward the drive roller 80. When this occurs, the pressure roller 70 is moved to urge the tape 50 into pressure contact driving engagement with the drive roller 80. This position of the yoke 52 is hereinafter referred to as the driving position.

A spring 102 has one end connected to the transverse rod 62 and the other end connected to a base 104 of the solenoid 92. The spring tension of spring 102 is in a direction tending to rotate the yoke 52 about pivot shaft 64, in a direction to move the pressure roller 70 away from the drive roller 80. The spring 102 serves as a return spring to place the yoke in a rest position and when solenoid 92 is de-energized, the spring 102 immediately retracts the pressure roller 70 from the drive roller 80 and the knife 72 cuts the tape 50.

A micoswitch 106 is disposed below and is positioned to be contacted by the end of the side plate 56 disposed opposite the knife 72 when the yoke 52 is in the driving position. The microswitch 106 has leads 108 and 110 to energize the motor 112, which motor is connected by leads 114 and 116 to a source, for example, an alternating current (AC) source 118. The motor 112 has the drive shaft 120 extending from one side thereof and the other end of the shaft 120 extends from the other side thereof and is connected to a chopper 122. The chopper 122 is cylindrical and has a plurality of slots 124 formed in its periphery. The chopper 122 is located within a housing 126. The housing 126 supports a light source 128 in the center of the chopper 122 such that it is surrounded by the plurality of slots. A photosensitive device 130 is disposed within the housing 126 adjacent the outside of the chopper 122 such that light energy from light source 128 impinges on photosensitive device 130 when one of the slots is in alignment therebetween.

The light source 128 and the photosensitive device 130 are diagrammatically connected by lines 132 and 134 respectively, to the pulse shaper 36. The photosensitive device 130 transmits a pulse through line 134 each time the light energy from the light source 128 impinges thereon. As described in FIGURE 2, the length selection device 30 and the pulse sharper 36 are connected to the control circuit 32. Control circuit 32 is connected to the flip-flops 38 which are shown diagrammatically connected to solenoid 92 by lines 136 and 138, which solenoid is connected by leads 140 and 142 to a source, for example, alternating current (AC) source 144.

Prior to operation of the tape dispensing mechanism 48, the yoke 52 is in the normal rest position wherein the spring 102 urges the knife 72 across the tape path and against the cutter platform 74 while concurrently holding the pressure roller 70 out of contact with the tape 50 and out of driving position with respect to the drive roller 80. The solenoid 92 and the drive motor 112 are de-energized.

In operation, the tape dispenser is conditioned to dispense a predetermined length of tape by depressing a push button having an assigned predetermined length equal to the length of tape desired. When a push button is depressed, the preselection unit 30 conditions the control circuit 32 to receive a predetermined number of pulses representative of the length of tape selected. The control circuit 32 drives the flip-flops 38 into their set state which, through line 136, energize the solenoid 92 by leads 140 and 142 from the AC source 144.

When the solenoid 92 is energized, the armature pulls linkage 100 downward (as shown in the drawing) to pivot the yoke 52 and move the pressure roller against the tape 50 and into driving position with the feed roller 80 under the tension of springs 96 and 98. The side plate 56 contacts and closes microswitch 106 while raising the knife 72 above the tape path across the cutter platform 74 against the tension of spring 102.

When microswitch 106 is closed, the motor 112 is energized by leads 114 and 116 from the AC source 118. The drive motor 112 starts at a low revolution per minute (r.p.m.) and builds up to its operating r.p.m. The drive motor 112 rotates the sprocket wheel 88 in a counter-clockwise direction as shown in FIGURE 3 to drive the chain 86 and drive roller 80. Drive roller 80 feeds the tape 50 in a direction shown by arrow 146, the pressure roller 70 continually urging the tape 50 against the periphery of drive roller 80 during the tape dispensing operation.

Simultaneously, the drive motor 112 drives the chopper 122, mounted on the drive shaft 120, at the drive shaft r.p.m. The pulse generator produces a fixed number of pulses per revolution of the chopper 122. The pulses are applied to the pulse shaper 36 and each pulse is shaped and applied to the control circuit 32. The pulses are accumulated by the control circuit 32 as the tape dispensing mechanism 48 dispenses the tape 50.

The control circuit 32 accumulates pulses until the last pulse of the predetermined number of pulses is received. When the control circuit 32 receives the last pulse, it drives flip-flops 38 from their set state back into their reset state. The flip-flops 38 de-energize solenoid 92. When solenoid 92 is de-energized, the spring 102 biases the yoke 52 to its non-driving position. Concurrently, the knife 72 cuts the dispensed length of tape and the side plate 56 is moved out of contact with microswitch 106 to de-energize the motor 112.

Referring now to FIGURE 4, a switch support plate 150, disposed beneath the panel 12, is illustrated which supports the switch elements of the momentary contact switches 14 and 16 and the variable resistors which are the operative components of the variable length selectors 22. The elements of FIGURE 4 are identified by the same numerals corresponding to the appropriate elements in FIGURE 1.

Basically, the switch plate 150 comprises a printed circiut board having an insulating base 152 with an upper surface 154 and a lower surface 156. Upper surface 154 supports a first row of resilient switch arms 158 and a second row of resilient switch arms 160. A single variable length switch arm 161 is positioned at one end of the rows of switches 158 and 160. At the lower end of the rows of switches 158 and 160 and between the switches 161 is a single random length switch arm 162.

Each switch row has a single common conductor 163, which conductor 163 has an input terminal 164 to which a source of potential (not shown), for example, could be supplied. Each switch 158 and 160 is structurally identical, and for purposes of description, a single switch 158 will be described. Conductively joined to the conductor 163 and extending through the base 152 is a lead 166 having a terminal end 168. The switch 158 is generally rectangular in shape and made of a conductive spring like material, for example, stainless steel. The switch 158 is mechanically joined to the base 152 at point 169 and is connected at 169 to adjacent ends of resistors 170 which are joined in series between the ends of the switches 158. The switch 158 is positioned in a closely spaced relationship with the terminal end 168 of the lead 166 such that depression of the switch 158 conductively bridges the series connected resistors with the conductor 163 to close a circuit. Release of pressure on the switch 158 opens the circuit.

Similar electrical connections are made for the switches 161 and for switch 162 so they are operative as will be described in greater detail in the description of the schematic circuit shown in FIGURES 6A and 6B.

The adjustable variable length selectors 22 shown at the top of the insulating base 152 are potentiometers well known in the art and each include appropriate leads for connection thereto to their respective variable length switches 16.

Considering the scale member of FIGURE 5, it is an elongated member 190 which is triangularly shaped in cross-section and is mounted above the support plate 150 between the rows of switches 158 and 160. The member 190 has one end joined to a disc member 192, the rim thereof being knurled to permit easy rotation of the member 190 about its longitudinal axis. The other end of member 190 is rotatably mounted to a frame member 194 of the dispensing device. The shape of member 190 provides three surfaces upon which graphic symbols are positioned with one scale or set of symbols being positioned adjacent each row of switches. Two such surfaces 196 and 198 are shown in the drawing and indicate two examples of the ranges which may be assigned to the buttons 14.

When the member 190 is in one reference position to expose the surface 196 the twelve square-shaped areas, each having a numeral therein, are positioned adjacent the buttons 14 which numerals represent the predetermined tape length assigned to each push button. The areas are arranged in two rows with six areas per row corresponding to the predetermined length buttons 14 in each row.

When the triangular shaped member 190 is in any one of its three reference positions a surface is aligned with the panel 12 and discloses a range of values for each button 14. A pair of multicontact switches 238 and 240 are connected to disc 192 of member 190 and the switches are each provided with a movable contact 243 and three fixed range contacts 244, 246 and 248. In each reference position the movable contact 243 of each switch is connected to one of the range contacts to complete an electrical path through said movable contacts and the associated range contact. The movable contacts 243 are each electrically connected to the circuit of the push button switches 158 and 160 as will be described in greater detail hereinafter and the fixed range contacts are connected to resistor-switch matrix as will be hereinafter described.

Each reference position of the scale member places a different length value on each button. It is apparent that the length increments increase in the same proportion on each surface of the member. The surface 198 starts with "36" in the first row right area and the range extends to "69" providing a range of 33 increments.

FIGURES 6A and 6B are schematic diagrams of the pulse responsive unit control, illustrating a preferred embodiment. The left side of the schematic diagram of FIGURE 6B should be disposed to the right side of FIGURE 6A. In these figures the blocks corresponding to those of FIGURE 2 are shown by a dashed outline, and in the description thereof the numerals of elements previously described are retained. The graphs of FIGURE 7 illustrate waveforms of pulse produced by the pulse generator 34 and the pulse shaper 36.

Considering now the schematic diagram of FIGURES 6A and 6B, the length selection device 30 includes the push buttons 14, the variable length selectors and multi-contact switches 238 and 240 of the rotatable scale member 20. The length selector device 30 is to produce a predetermined voltage signal in response to a push button 14 or 16 being depressed, which signal is ultimately used to place a pre-charge level on a storage capacitor in the control circuit 32 as described hereinafter.

The push buttons 14 are connected in a resistor-switch matrix arrangement, with each switch having one terminal connected to a common lead 163 and its other terminal connected to one of a plurality of series connected resistors 170. The switches 14 are connected with the resistors 170 such that closing of one switch bypasses a portion of the resistor-switch matrix. As seen in FIGURE 6A the switches at the ends of the matrix are connected to the movable contacts 243 of the multicontact switches 238 and 240 at contact points 242. Each range contact is connected to one end of a range resistor 250 such that when the movable contact 243 is connected to a different one of the fixed range contacts 244, 246 and 248 resistance of the circuit, including the resistor-switch matrix, is selectively varied. The resistors 250 connected to multicontact switch 238 are connected to an input conductor 252 and the resistors 250 of multicontact switch 240 are connected to a conductor 260. Input conductor 252 is connected to a regulated bus 256, which bus 256 is connected to a source of regulated positive potential 258. A pre-charge conductor 254 is connected to the common lead 163 and to the control circuit 32. The conductor 260 is connected from the multicontact switch 240 to ground within the pulse shaper 36.

The movable contact 243 of each multicontact switch is movable with the scale member 20. As each set of numerical values is selectively rotated to reference position adjacent the switches 14, the movable contact 243 connects one of the range contacts 244, 246 or 248 to the contact point 242 for each reference position.

When one of the switches 14 is closed, an electrical path through the resistor-switch matrix produces a predetermined voltage signal between the input conductor 252 and the pre-charge conductor 254, which voltage signal is used to pre-charge a capacitor within the control circuit 32. A current will flow from the source 258, through the regulated bus 256, input conductor 252, certain of the resistors 250 in multicontact switch 238, the appropriate fixed range contact 244, 246 or 248, the movable contact 243 and the contact point 242, through the plurality of series connected resistors 170 until a closed switch bypasses the current from the remaining resistors 170 to the common lead 163 and to the pre-charge conductor 254. If a number of resistors 170 are bypassed, the voltage applied to the pre-charge conductor 254, and subsequently to control circuit 32, is relatively high. Conversely if a very few resistors 170 are bypassed, the voltage applied to the pre-charge conductor 254, and subsequently to the control circuit 32, is relatively low. A discrete level of voltage is applied to the control circuit 32 depending on the set of numerical values placed adjacent the switches and on the selected switch closed, each discrete voltage level being representative of the numerical value assigned to the switch 14.

The buttons 16 are typical of the two variable length switches 161 in this embodiment and each variable length switch is connected to the variable length selectors 22 which are potentiometers and hereinafter designated 266 and 268. The potentiometers 266 and 268 are connected to the input conductor 252 and to the ground conductor 260 via one range resistor 250 in each multicontact switch 238 and 240 except a resistor 270 is connected in series with potentiometer 266 and 268 and the multicontact switch 240. Both switches 16 are connected to the pre-charge conductor 254 via a common lead 271 and the common lead 163.

Random length switch or push button 18 is connected to separate control lines 275 and 276 connecting directly to the load 40.

Operation of one of the variable length push buttons 16 requires presetting of the associated potentiometer 266 or 268 to a selected length. When the push button is closed, the input conductor 252 is electrically connected through the range resistor 250, the associated potentiometer, the closed variable length switch 16, the common lead 271 and common lead 163 to the pre-charge conductor 254, applying a discrete voltage to control circuit 32, which voltage is representative of the selected length.

Operation of the random button 18 serves to directly energize the load 40 via leads 275 and 276. The pulse responsive control circuit 32 received the pre-charge voltage when a button 14 or 16 is depressed through the pre-charge conductor 254. The pre-charge conductor 254 is connected to a first diode 278, which diode 278 is connected to one terminal of a storage capacitor 280 at terminal point 282. The first diode 278 is connected in a direction to apply a charge on storage capacitor 280. The other terminal of storage capacitor 280 is connected to one end of a first resistor 284, at a terminal point 286. The other end of resistor 284 is connected to the ground conductor 274. The pre-charge conductor 254 also connects the length selection device 30 to a conductor 288, which conductor 288 is connected to the flip-flops 38 of FIGURE 6B.

The control circuit 32 further includes an input conductor 292 adapted to apply an input pulse of uniform amplitude and duration to a linear current source generator generally designated 294, including a series of temperature compensation diodes 296, diodes 306, a pair of pnp transistors 300 and 302, resistor 298 and a diode 310. The conductor 292 is connected to the diodes 296 which are connected in series and with one end of a charging resistor 298. The other end of the resistor 298 is connected to the base of the transistor 300 and to the emitter of transistor 302. The emitter of transistor 300 is connected to the conductor 260 via a resistor 304 and to ground conductor 274. The diodes 306 are connected between the emitter of transistor 300 and input conductor 292 before its connection to the diodes 296. The collector of transistor 300 is connected to the base of transistor 302 such that a decrease in potential of said collector will substantially increase the conductivity of transistor 302. The collector of transistor 300 and the base of transistor 302 are connected to ground conductor 274 via a ground resistor 308. The collector of transistor 302 is connected via the charging diode 310 to the storage capacitor 280 at terminal point 282. The diode 310 is connected in a direction to apply a charge to the storage capacitor 280.

A biasing network is connected from the input conductor 292 to the opposite side of the storage capacitor, from the linear current source generator 294, at terminal point 286. The biasing network includes a biasing resistor 312 and a biasing capacitor 314 connected in series with the biasing resistor 312 connected directly to the terminal point 286.

A bypass resistor 316 is connected to the biasing capacitor 314 between said capacitor and the terminal point 286. A bypass diode 318 is connected in parallel to the resistor 316, and said diode 318 is connected in a direction to be forwardly biased when terminal point 286 is at a lower potential than the potential across resistor 316. The bypass resistor 316 and diode 318 are connected to a line 320, which line is connected to the flip-flops 38.

The terminal of storage capacitor 280 at terminal point 282 is connected to one end of a second resistor 322. The other end of resistor 322 is connected to a device exhibiting negative resistance characteristics and capable of being driven into conduction at a predetermined charge level. A device utilized in this embodiment exhibiting such negative resistance characteristics is a unijunction transistor 324 having an emitter 326, a first base 328, and a second base 330. The emitter 326 is connected to the other end of second resistor 322. The first base 328 of transistor 324 is connected by a conductor 332 to the ground conductor 274 and the second base 330 is connected to the source of positive potential 258 via line 334. The second base 330 is connected to one terminal of a filter capacitor 336, the other end of said capacitor 336 being connected to ground conductor 274. The second base 330 is also connected through a resistor 338 and a trim resistor 340 to ground conductor 274. The resistors 338 and the capacitor 336 are connected in parallel circuit relation between the ground conductor 274 and the regulated bus 256 to pass transients from the regulated bus 256 to the ground conductor 274. In addition, the second base 330 is connected to the regulated bus 256 via a resistor 341.

The second resistor 322, the storage capacitor 280 and the diode 310 are connected to a grounding diode 342, which diode is connected to a grounding resistor 344. The diode 342 is connected to be forwardly biased when the terminal point 282 is at a higher potential than the potential across resistor 344. The resistor 344 is connected to a grounding line 346, which line 346 connects to the flip-flops 38 and thereby to a ground potential when the circuit means is in its quiescent state.

A filter capacitor 348, having a shunt resistor 350 in parallel circuit relation therewith, is connected between an unregulated bus 352 and the ground conductor 274 to pass transients from the unregulated bus 352 to the ground conductor 274. A voltage dividing resistor 354 has one end connected to the bus 352, the other end thereof being connected to one terminal of a voltage dividing capacitor 356. The other end of capacitor 356 is connected to the ground conductor 274. A clamping diode 358 is connected to the other end of resistor 354 and to the one terminal of the capacitor 356. The other end of diode 358 is connected to the grounding line 346 and to one end of a voltage dividing resistor 360. The other end of the resistor 360 is connected to the bus 352. The clamping diode 358 is connected to be forwardly biased to clamp the voltage on grounding line 346 to the potential of unregulated bus 352 when the pulse responsive control circuit is operative.

Referring now to the schematic diagram of the pulse generator 34 of FIGURE 6A, the chopper 122 is illustrated as having slot 124 thereof aligned between the light source 128 and the photosensitive device 130. One terminal of the light source 128 is connected by lead 362 to a source of unregulated positive potential 365. The other terminal of light source 128 is connected to the unregulated source lead 364, which lead is connected to and energizes the unregulated bus 352 as shown in FIGURE 6B. The light source 128 thus serves to disable the power supply to the control circuit means if the light source becomes inoperative.

In the illustrated device the photosensitive device 130 is an n.p.n. photosensitive transistor having a collector, an emitter and a base. The transistor 130 is positioned adjacent the slot 124 so the base thereof receives light energy from the light source 128 when the slot 124 is in alignment therebetween. The collector of transistor 130 is connected to one end of a load resistor 368. The other end of resistor 368 is connected to the unregulated bus 352. The emitter of transistor 130 is connected to one end of an emitter resistor 370 at terminal point 372, the other end of said resistor 370 being connected to the ground conductor 274. The base of transistor 130 is floating in potential, and when light energy from the light source 128 impinges on said base of the transistor 130 the impedance between the collector and the emitter of transistor 130 abruptly changes thereby generating a pulse.

An npn transistor 374 of the generator 34 is used to amplify the output pulse from the transistor 130. The base of transistor 374 is connected at terminal point 372 to the emitter of transistor 130 and to the emitter resistor 370. The emitter of transistor 374 is connected to the ground conductor 274 via lead 376. The collector of transistor 374 is connected through a load resistor 378 to the bus 352. A coupling capacitor 380 has one terminal connected to the collector of transistor 374 and the other terminal of said capacitor 380 is connected to an output line 382. The output line 382 transmits the pulses from the pulse generator 34 to the pulse shaper 36. The pulses produced by the pulse generator 34 are of uniform amplitude but varying in duration.

The pulse shaper 36 may be any known pulse shaping means for producing a pulse of uniform amplitude and duration in response to a pulse applied thereto from the pulse generator 34 via output line 382. The pulse shaper 36 has a first npn transistor 384 having its base connected to the output line 382. A filter capacitor 386 has one terminal connected to the output line 382 and its other terminal connected to the ground conductor 274 to pass transients to said ground conductor. A voltage dividing resistor 388 has one end connected to the base of transistor 384 and its other end connected to the ground conductor 274. A voltage dividing resistor 390 has one end connected to the one end of the voltage dividing resistor 388 and to the base of transistor 384. The other end of the resistor 390 is energized from the bus 256 as will be described. The collector of transistor 384 is connected to one end of a load resistor 392. The other end of resistor 392 is connected to a diode 394, which diode 394 is connected to the regulated bus 256. The diode 394 is connected in a direction to apply the potential of the bus 256 to the collector of the transistor 384. The emitter of transistor 384 is connected via a line 396 to the ground conductor 274. A coupling capacitor 398 has one terminal connected to the collector of transistor 384. The other terminal of capacitor 398 is connected to one end of a voltage dividing resistor 400. The other end of resistor 400 is connected to one end of a variable resistor 402, the other end of said variable resistor being connected to the regulated bus 256. A voltage dividing capacitor 404 has one terminal connected to the one terminal of capacitor 398, the other terminal of said capacitor 404 being connected to the ground conductor 274. A second npn transistor 406 has its base connected to the one terminal of capacitor 404 and to the other terminal of capacitor 398. The collector of transistor 406 is connected to one end of a load resistor 408 connected also to the regulated bus 256. The collector of transistor 406 and the resistor 408 are connected to the voltage dividing resistor 390 to supply potential from the regulated bus 256 when transistor 406 is nonconductive. The input conductor 292 is connected to the collector of transistor 406 and said input conductor applies the pulses from the pulse shaper 36 to the control circuit 32. The pulse produced by the pulse shaper are of uniform amplitude and duration.

The flip-flop 38 of FIGURE 6B are connected to the control circuit 32 through the unregulated bus 352, grounding line 346, ground conductor 274, bypass conductor 320 and pre-charge line 288. The flip-flops 38 include two flip-flops, an instantaneously setting flip-flop 420 and a time delay setting flip-flop 422. Flip-flop 420 comprises two npn transistors 424 and 426 with each base thereof cross-coupled to the collector of the other transistor through resistors 428 and 430 respectively. The collector of transistor 424 is connected to the grounding line 346 from the control circuit 32. The base of transistor 424 is connected to the ground conductor 274 through a voltage dividing resistor 432 and the emitter of said transistor 424 is connected to said ground conductor 274 via conductor 434.

The collector of transistor 426 is also connected to the unregulated bus 352 via a load resistor 436 and the emitter of said transistor 426 is connected to the ground conductor 274 via a lead 438. The bypass line 320 from the control circuit 32 is connected to the base of transistor 426.

The second flip-flop 422 has a first npn transistor 440 and a second npn transistor 442. The base of transistor 440 is cross-coupled to the collector of transistor 442 through a resistor 444. The collector of transistor 440 is connected via a load resistor 446 to the unregulated bus 352 and the emitter of the transistor 440 is connected to the ground conductor 274 via a line 448. The base of transistor 440 is conected to the ground conductor 274 via a resistor 450, and said base is also connected to the pre-charge line 288 via a pre-charge resistor 452 and a conductor 454.

The base of transistor 442 is connected to the collector of the transistor 440 via series connected resistors 456 and 458 and the base is connected to the ground conductor 274 via a resistor 460. A capacitor 461 is connected between the series connected resistors 456 and 458 and the ground conductor 274. In addition, the base of transistor 442 is connected to the collector of transistor 426 of the other flip-flop 420 via resistor 462. The collector of the transistor 442 is connected to bus 352 via a load resistor 464. The emitter of the transistor 442 is connected to the ground conductor 274 via a conductor 466. An output line 468 is connected to the collector of transistor 442 to apply a voltage from the flip-flop 422 to the load 40.

The load 40 has two npn transistors 470 and 472. The base of transistor 470 is connected to one end of a voltage dividing resistor 474, the other end of said resistor 474 being connected to the output line 468. The base of transistor 470 is connected to the conductor 276 via resistor 475 which is connected to one contact of the random switch 18 and the other contact of switch 18 is connected by conductor 275 to the unregulated bus 352. The emitter of transistor 470 is connected to the ground conductor 274 via line 476 and the collector of the transistor 470 is connected to the regulated bus via a load resistor 478. The collector of the transistor 470 is also connected via a line 480 and a diode 482 tothe pre-charge conductor 288. The diode 482 is connected to be forwardly biased when the pre-charge conductor 288 is at a higher potential than the collector of the transistor 470.

The base of the transistor 472 is connected via a resistor 484 to the collector of the transistor 470. The emitter of the transistor 472 is connected to the ground conductor 274 via a conductor 486. The collector of the transistor 472 is connected to the unregulated bus 352 via a load resistor 488. A silicon controlled rectifier transistor 490 hereinafter referred to as an SCR transistor, has an anode 492, a cathode 494 and a gate 496. The gate 496 is connected to the collector of the transistor 472 via a conductor 498. The anode 492 is connected to a common line 500. The cathode 494 is connected to the ground conductor 274. A resistor 502 and a filter capacitor 504 are connected in series between the ground conductor 274 and the common line 500. A pair of parallel networks are also connected between the ground conductor 274 and the common line 500, the first of said pair of networks including a pair of series connected diodes 506 and 508 to be forwardly biased when the common line 500 is at a potential lower than the potential of the ground conductor 274 and the second of said pair of networks including a pair of series connected diodes 510 and 512 are also forwardly biased when the common line 500 is at a potential lower than the potential of the ground conductor 274. An alternating current source 514 is connected via a line 516 to the first network between the diodes 506 and 508 and via a line 518 to a coil 520, representing the coil of solenoid 92. The coil 520 is connected via line 522 to the second network between the diodes 510 and 512.

Prior to operation of this tape dispenser by the electric control means all of the push buttons of the length selection unit 30 are in the open position. Power is supplied from a suitable source to the electrical control means to provide a regulated and unregulated source of positive potential as described hereinbefore. The pulse generator 34 is disabled, and the pulse shaper 36 is in a quiescent state with the transistor 406 conducting holding input conductor 292 at ground potential. The storage capacitor 280 is initially discharged and the unijunction transistor 324 of the control circuit 32 is in its nonconductive state. At this time, if any pulses are applied to the input conductor 292 the linear current source generator 294 would apply the pulses through diode 310 and the grounding diode 342 which would transmit the pulses through resistor 344 and grounding line 346 to the ground conductor 274 through the transistor 424 of the flip-flop 420 which is in its conductive state. The transistor 442 of the flip-flop 422 is in its conductive state. The capacitor 461 of the flip-flop 422 is charged from the unregulated bus 352 via the resistor 446 and the resistor 458. The transistor 472 of the load 40 is in its conductive state and the SCR transistor 490 is in its nonconductive state since the cathode 494 is connected to the gate 496. With the SCR transistor 490 in its nonconductive state the coil 520 is de-energized.

If it is desired to dispense a random length of tape the button 18 is depressed which connects a positive potential from the unregulated bus 352, if the light source 128 is operative, to the base of the transistor 470 driving the transistor 470 into conduction. In turn, the base of the transistor 472 is connected to ground through the transistor 470 making the transistor 472 nonconductive. When transistor 472 becomes nonconductive a positive potential is placed on the gate 496 of the SCR transistor 490 making the transistor 490 conductive to allow the alternating current source 514 to energize the coil 520. When the coil 520 of the solenoid is energized the yoke 52 pivots about the shaft 64 placing the pressure roller 70 into tape driving engagement with the tape 50 and driven roller 80, raising the knife 72 and closing microswitch 106 to energize the drive motor 112. Tape will then be fed from the dispenser until the button 18 is released. When the button 18 is released the transistor 470 returns to its nonconductive state, the transistor 472 returns to its conductive state and the SCR transistor 490 returns to its nonconductive state to de-energize the coil 520 which will discontinue the feed dispensing mechanism and cut the dispensed length of tape.

When it is desired to dispense a predetermined length of tape the rotatable scale member 20 is turned to a predetermined position placing a predetermined range of graphic symbols adjacent the push buttons 14. The desired push button is then depressed which closes the circuit between the regulated power supply 258 to the control circuit 32 and through the control circuit 32 to the flipflops 38. This provides a predetermined voltage drop on the pre-charge conductor 254 which voltage drop is determined by one or more of the resistors 250 associated with the multicontact switch 238, the resistance, if any, of the resistors 170 of the switch-resistor matrix, from the point contact 242 along the series resistors 170 to the closed button 14, and by the resistor 452 in the conductor 288 and the resistor 450 positioned beween the line 454 and the ground conductor 274. This predetermined level of the voltage on pre-charge conductor 254 is then applied through the diode 278 to the storage capacitor 280 precharging the said storage capacitor to a pre-charge level. The pre-charge level placed on the storage capacitor 280 determines the number of pulses required to raise the charge level of the storage capacitor from the pre-charge level to a higher predetermined level sufficient to drive the unijunction transistor 324 into conduction.

As the pre-charge voltage level is applied to the storage capacitor 280 the potential of terminal point 286 immediately rises to a positive potential and then is returned to ground potential as the storage capacitor 280 charges. As this potential returns to ground potential a positive pulse is produced and is applied via the bypass resistor 316 and line 320 to the base of the transistor 426 in the flipflop 420. This positive potential pulse causes the transistor 426 to become conductive which in turn makes transistor 424 nonconductive. When the transistor 426 is made conductive it places a ground potential through resistor 462 to the base of the transistor 442 of the flip-flop 422. When the base of the transistor 442 has a ground potential applied thereto, the capacitor 461 is discharged through the resistor 456 through both of the resistors 460 and 462 which conduct the charge from the capacitor 461 to the ground conductor 274. The capacitor 461 will hold the base of the transistor 442 sufficiently positive to keep the transistor 442 conducting for about 4 milliseconds, and after that period of time the base becomes negative to drive the transistor 442 into its nonconductive state causing the potential of its collector to rise to approximately the potential of the unregulated bus 352, which collector also applies this positive potential to the base of the transistor 440 via the resistor 444. The positive potential placed on the base of the transistor 440 drives the transistor 440 into conduction until such time as the flip-flop 420 is reset. The potential placed on the collector of the transistor 442 is also applied to the base of the transistor 470 to drive the transistor 470 into conduction. When transistor 470 is conductive, the ground potential is applied to the base of the transistor 472 via the resistor 484 to make the transistor 472 nonconductive. When this transistor 472 is made nonconductive a positive potential is applied to the gate 496 of the SCR transistor 490 driving this transistor into conduction to close a circuit between the AC source 514 and the coil 520 of the solenoid 92. Again, the motor 112 becomes energized upon the closing of the microswitch 106 and the tape feed mechanism begins to feed tape and the pulse generator 34 produces its pulses. If the button 14 was not depressed and held for a sufficient time to cause the transistor 442 of flip-flop 422 to become conductive the coil 520 will not be energized. This time delay in the flip-flop 422 insures that the storage capacitor 280 is properly pre-charged from its substantially discharged level to the predetermined voltage level such that an accurate length of tape will be dispensed.

Assuming that the button was depressed for a sufficient length of time to pre-charge the storage capacitor 280 the light energy from the source 128 will pass through the slots 124 in the chopper member 122, abruptly changing the impedance in the phototransistor 130 as each slot allows light energy to impinge upon the phototransistor producing a pulse output therefrom which is amplified by the amplifying transistor 374. The amplified pulses are transmitted by the output line 382 to the transistor 384. The positive pulses then drive the transistor 384 into conduction. Then the capacitors 398 and 404 cause the voltage on the base of the transistor 406 to become sufficiently negative to drive the transistor 406 out of its conductive state. The transistor 406 remains nonconductive and transistor 384 remains conductive until the capacitors 398 and 404 become charged to a positive potential, which potential is applied to the base of transistor 406. When the positive potential applied to the base of transistor 406 is of sufficient magnitude the transistor 406 is driven into conduction. When transistor 406 is driven back into its conduction state the voltage dividing resistor 370 applies a ground potential to the base of transistor 384 making the transistor 384 nonconductive. The time required for the transistor 406 to be driven from its conductive state to a nonconductive state and back to its conductive state determines the duration of each output pulse, and this duration is equal for each pulse.

Figure 7A:
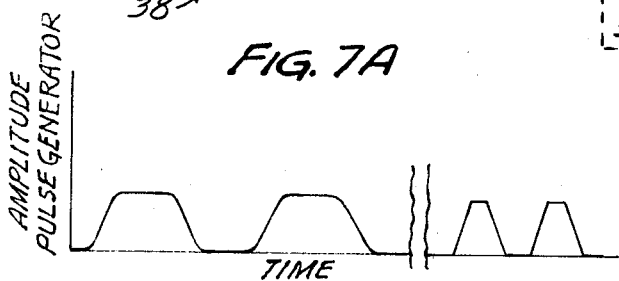
FIGURES 7A and 7B are graphs illustrating waveforms of pulses from the pulse generator and the pulse shaper respectively of FIGURE 6A.

The pulses from the pulse shaper 36 are applied to the control circuit 32 via input conductor 292. The graph of FIGURE 7A illustrates the waveform of the pulses produced by the pulse generator 34 as the drive motor 112 accelerates from start to operating speed. The pulses produced from the pulse generator 34 are of uniform amplitude but vary in duration due to the varying speed of the chopper member 124 as it is accelerated from start to operating speed. At the time that the drive motor 112 is initially energized the feed mechanism is in dispensing position with respect to the tape.

Figure 7B:
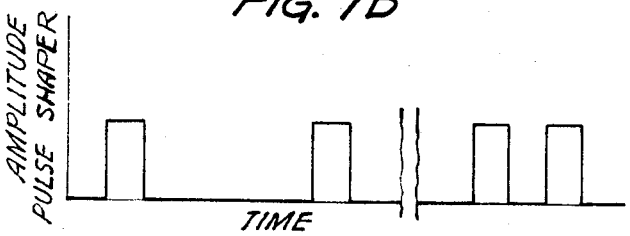

When the pulses from the pulse generator 34 are applied to the pulse shaper 36 pulses of uniform amplitude and duration will be produced, the graph of FIGURE 7B illustrates these waveforms. Since the pulse generator 34 produces fewer pulses when the drive motor 112 is started as compared to the number of pulses generated at operating speed of the drive motor 112, the pulse shaper 36 will produce fewer pulses at the beginning of its operation and will produce more pulses when the drive motor 112 is at operating speed. All pulses from the pulse shaper 36 will be of uniform amplitude and duration.

The input conductor 292 applies the pulses received from the pulse shaper 34 to the linear current source generator 294. The generator 294 applies the pulses to transistors 300 and 302 via the series connected diodes 296 and the resistor 298. The pulses applied to the emitter of transistor 302 cause the transistor 302 to become conductive. As transistor 302 becomes conductive, transistor 300 is also made conductive causing the emitter of transistor 302 to become more positive and to slightly increase the conductivity of transistor 302 to a higher point. The collector of transistor 302 applies the positive potential to diode 310 to raise the charge level on capacitor 280 in response to each pulse received from the pulse shaper 36. The linear current source generator 294 functions to increase the charge level on the capacitor 280 in a linear relationship as the capacitor 280 is charged. As the capacitor 280 approaches the predetermined charge level, which charge level is the point at which the unijunction transistor 324 will be driven into conduction, the generator 24 will supply the potential difference between the actual charge on the capacitor 280 and the charge necessary to maintain a linear relationship between voltage and time on a graph indicating the charging rate of the storage capacitor 280. As the pulses from the pulse shaper 36 are applied to the generator 294 and to the capacitor 280 the pulses are also applied to the biasing resistor 312 and the biasing capacitor 314 to momentarily raise the potential of terminal point 286 slightly above the potential of the ground conductor 274 while the biasing capacitor 314 is charging. Concomitantly this increase in the potential at the terminal 286 raises the charge level on the storage capacitor 280 incrementally during the charging of said capacitor 280 through the generator 294. Thus, for each pulse which is received by the control circuit 32 a uniform increase in the charge level on the storage capacitor 280 is effectively obtained.

As the predetermined charge level on the capacitor 280 is reached by the preselected number of pulses, raising the charge thereon from the pre-charge level to the predetermined level, the unijunction transistor 324 is driven into conduction causing the capacitor 280 to be discharged through the second resistor 322, the emitter 326 and the first base 328 of the unijunction transistor 324 and the conductor 332 to the ground conductor 274 and through the first resistor 284 to the terminal point 286. As the unijunction transistor 324 conducts, the terminal point 286 becomes negative with respect to the ground potential of ground conductor 274. This negative potential causes the bypass diode 318 to become conductive and causes the potential on the base of the transistor 426 to become sufficiently negative to drive the transistor 426 out of conduction. When the transistor 426 becomes nonconductive the transistor 424 is driven back into its conductive state. A positive potential is then produced on the collector of the transistor 426 and this positive potential is applied through resistor 462 to the base of the transistor 442 driving the transistor 442 back into conduction. When the transistor 442 becomes conductive the transistor 440 is driven back into its nonconductive state by the ground potential being applied to its base through the resistor 444. The ground potential of the collector of the transistor 442 is also applied to the base of the transistor 470 driving it into its nonconductive state and providing a positive potential on its collector to drive the transistor 472 back into conduction. When the transistor 472 becomes conductive the SCR transistor 490 becomes nonconductive and de-energizes the coil 520 of the solenoid 92. This de-energizes the tape feeding means and cuts the length of dispensed material.

If it is desired to dispense two preselected variable lengths of tape at a frequency which makes it desirable to only push two buttons and not have a second manual step of adjusting the scale member 20, the dials of the variable length selectors 22 can be rotated to position the pointer at the desired length and such lengths may then be produced by pushing the pushbuttons 16. When the variable length selectors 22 are adjusted the potentiometers 266 and 268 are adjusted to provide a predetermined voltage drop thereacross resulting in a voltage drop between the input conductor 252 and the pre-charge conductor 254. Thus, when the button 16 is pressed which is associated with the potentiometer 266 a predetermined voltage drop will be applied to the pre-charge conductor 254 and this pre-charge voltage will be applied to the storage capacitor 280 and will also be applied to the flip-flops 38. The operation of the dispensing device will then continue in the manner as aforedescribed with respect to the operation thereof upon depressing the button 14. That is, a pre-charge will be placed on the storage capacitor to control the number of pulses required to deactuate the feeding mechanism. It is to be remembered that the button 16 must also be depressed for a sufficient length of time to allow the storage capacitor 280 to reach the pre-charge level and this time interval is controlled by the flip-flop 422.

The novel device of the present invention is particularly adapted for the dispensing of paper tape having a water activated adhesive. It will therefore be understood that a suitable tape moistening means (not shown) will be disposed adjacent the dispensing device forward of the front wall thereof and of the opening 24 or the moistening means will be disposed between the cutter knife 72 and the opening 24 in the front wall of the dispensing device.

Having thus described the present invention with reference to a preferred embodiment, it will be appreciated that certain changes and modifications may be made therein without departing from the scope of the present invention.

What is claimed is:

1. In a device for feeding selected lengths of strip material, comprising,
    (a) a drive roller;
    (b) a motor;
    (c) means affording a driving connection between the motor and drive roller;
    (d) a panel;
    (e) a plurality of push buttons mounted on said panel, each push button representing a predetermined length of strip material;
    (f) means capable of moving said strip material into releasable driving engagement with said drive roller and of actuating said motor when said strip material is in said releasable driving engagement;
    (g) circuit means energized by operation of any one of the push buttons to actuate said moving and actuating means for moving said strip material into said releasable driving engagement with said drive roller and for actuating said motor;
    (h) a pulse generating device operative upon operation of said motor; and
    (i) means for disabling said circuit means in response to the generation of a predetermined number of pulses by said pulse generating device to discontinue operation of the motor.

2. A device for feeding selected lengths of strip material comprising,
    (a) strip material feeding means operative to feed strip material;
    (b) a panel;
    (c) a plurality of push buttons on said panel, each push button representing a predetermined length of strip material;
    (d) a pulse generating means operative upon actuating said strip material feeding means;
    (e) an electrical control means for actuating said feeding means and after the generating means produces a predetermined number of pulses for deactuating said feeding means, said control means including
        (1) means for storing a predetermined level of electrical energy and for producing an output signal when said predetermined level is reached, which signal will deactuate said feeding means;
        (2) means connected with said push buttons for pre-charging said means for storing electrical energy to place a pre-charge level thereon between a substantially discharged level and said predetermined level; and
        (3) means connected to said generating means and said means for storing electrical energy to apply incremental charges to said means for storing electrical energy to raise the charge level thereon from said pre-charge level to said predetermined level.

3. A tape dispenser for dispensing measured lengths of tape, comprising,
    (a) a drive roller;
    (b) a motor;
    (c) means affording a driving connection between the motor and the drive roller;
    (d) a pressure roller;
    (e) yoke means pivotally supporting the pressure roller for movement toward and away from the drive roller and into and out of a driving position with respect to the drive roller;
    (f) electrically operated means for pivoting the yoke means to hold the pressure roller in said driving position and for energizing said motor;
    (g) a control panel including a plurality of buttons, each button representing a predetermined length of tape;
    (h) circuit means energized by operation of one of said buttons to operate said electrically operated means;
    (i) a pulse generating device operative upon energization of said motor; and
    (j) means for disabling the circuit means in response to a number of pulses from the pulse generator being received by said means for disabling said circuit means to discontinue operation of the electrically operated means.

4. A device for feeding selected lengths of strip material comprising,
    (a) strip material feeding means operative to feed strip material; said feeding means including a driven roller, a pressure roller movable toward and away from said driven roller, and means for driving said driven roller;
    (b) a panel;
    (c) a plurality of push buttons on said panel, each push button representing a predetermined length of strip material;
    (d) a pulse generating means operative upon actuating said means for driving said driven roller;
    (e) an electrical control means for moving said pressure roller toward said driven roller, for subsequently actuating said means for driving said driven roller, and after the generating means produces a predetermined number of pulses for moving said pressure roller away from said driven roller, said control means including
        (1) means for storing a predetermined level of electrical energy and for producing an output signal when said predetermined level is reached;
        (2) means connecting with said push buttons for precharging said means for storing electrical energy to apply a precharge level thereon between a substantially discharged level and said predetermined level; and
        (3) means connected to said generating means and said means for storing electrical energy to apply incremental charges thereto to raise the pre-charge level to said predetermined level;
    whereby the output signal is produced to move the pressure roller away from said driven roller and to deactuate said means for driving said driven roller.

5. A strip material dispensing device comprising
    a frame,
    a feed roller fixedly mounted on said frame for rotating about an axis,
    a yoke pivotally mounted on said frame,
    a pressure roller rotatably mounted in said yoke on an axis parallel with the axis of said feed roller and mounted in spaced relation to the pivotal mounting of said yoke in a position to be moved toward and away from said feed roller upon the pivoting of said yoke to press a said strip material in pressure contact feeding engagement with said feed roller,
    drive means for said feed roller,
    means for pivoting said yoke to move said pressure roller toward said feed roller, and
    means responsive to the pivoting of said yoke to place said pressure roller in feeding position with respect to said feed roller for energizing said drive means.

6. A device for feeding selected lengths of strip material comprising,
   (a) strip material feeding means operative to feed strip material;
   (b) a control panel;
   (c) a plurality of push buttons arranged on said panel in a row;
   (d) a first circuit means including a switch-resistor matrix associated with said buttons to afford a different voltage level output from said first circuit means upon pressing any of said buttons;
   (e) a movable scale member, having a plurality of graphic symbols arranged thereon mounted on said panel in aligned relationship with said buttons, said member having a plurality of predetermined reference positions each of which places selected ones of said graphic symbols adjacent each of said push buttons;
   (f) at least one multicontact switch having a movable switching element connected to said scale member and having a plurality of fixed contacts, said switching element contacting a different one of said fixed contacts when said scale member is positioned in each of said predetermined reference positions;
   (g) a second circuit means including means for connecting said switching element in series with said switch-resistor matrix of said first circuit means affording a change in the voltage level output of said first circuit means;
   (h) a pulse generating means operative upon actuating said strip material feeding means;
   (i) an electrical control means for receiving said voltage level output to actuate said feeding means and after the generating means produces a predetermined number of pulses for deactuating said feeding means, said control means including
      (1) means for storing a predetermined level of electrical energy and for producing an output signal when said predetermined level is reached, which signal will deactuate said feeding means,
      (2) means connected with said push buttons for precharging said means for storing electrical energy to vary the charge level thereon between a low level and said predetermined level, and
      (3) means connected to said generating means and said means for storing electrical energy to apply incremental charges thereto to build the charge level to said predetermined level.

7. A device for feeding selected lengths of strip material comprising,
   (a) strip material feeding means operative to feed strip material;
   (b) a panel;
   (c) a plurality of push buttons on said panel, each push button representing a predetermined length of strip material;
   (d) a pulse generating means for generating electrical pulses of uniform amplitude and duration operative upon actuating said strip material feeding means;
   (e) an electrical control means connected to said pulse generating means for actuating said feeding means and after the generating means produces a predetermined number of pulses for deactuating said feeding means, said control means including a pulse responsive control unit having a storage capacitor for storing charge to a predetermined level wherein said predetermined level would appear on linear charging characteristics curve plotted for said capacitor, said capacitor having a first and second terminal, a unijunction transistor having a first base, a second base and an emitter, said transistor being driven into conduction when a potential equal to said predetermined level on said storage capacitor is applied thereto, first means connected to the second terminal of said storage capacitor for receiving said pulses from said generating means to apply a charge to said storage capacitor to raise the charge level thereon in equal increments for each pulse to produce a linear rate charging characteristics curve, and second means connected to said pulse generating means and to said first terminal of the storage capacitor for incrementally raising the charge level on said storage capacitor by charges from said pulses, the charge level on said storage capacitor being raised from said pre-charge level to said predetermined level upon said storage capacitor receiving a number of pulses to drive said unijunction transistor into conduction whereby a signal is produced to deactuate said feeding means.

8. A device for dispensing selected lengths of strip material comprising,
   (a) strip feeding means for feeding strip material;
   (b) means for selecting a predetermined length of strip material;
   (c) means capable of moving said strip material into releasable driving engagement with said strip feeding means and of actuating said strip feeding means when said strip material is in said releasable driving engagement;
   (d) electrical pulse generating means operative in response to actuation of said strip feeding means; and
   (e) control means connected to siad means for selecting a predetermined length of strip material, said pulse generating means, said moving and actuating means and said strip feeding means for moving said strip material into said releasable driving engagement and for actuating said strip feeding means in response to operation of said means for selecting a predetermined length of strip material and responsive to receiving a predetermined number of pulses from said pulse generating means for deactuating said strip feeding means.

9. In a device for dispensing selected lengths of strip material, comprising,
   (a) a strip material feeding mechanism;
   (b) driving means for said feeding mechanism;
   (c) a plurality of control members for selecting various predetermined lengths of strip material;
   (d) means capable of moving said strip material into releasable driving engagement with said feeding mechanism and of actuating said driving means when said strip material is in said releasable driving engagement;
   (e) electrical pulse generating means operative in response to operation of said driving means; and
   (f) electrical circuit means energized by operation of any one of said control members and operatively connected to said moving and actuating means for moving said strip material into said releasable driving engagement and for actuating said driving means, said electrical circuit means including means responsive to receiving a predetermined number of pulses from said pulse generating means for discontinuing operation of said driving means.

References Cited
UNITED STATES PATENTS

| 2,408,363 | 10/1946 | Beckman et al. | 83—243 |
| 2,892,500 | 6/1959 | Baron et al. | 226—135 X |
| 2,971,416 | 2/1961 | Stoeser | 83—243 X |
| 3,015,426 | 1/1962 | Dietz et al. | 226—135 X |
| 3,125,269 | 3/1964 | McGraw et al. | 226—135 X |
| 3,178,978 | 4/1965 | Eisenman | 83—243 X |

M. HENSON WOOD, Jr., *Primary Examiner.*

J. N. ERLICH, R. A. SCHACHER, *Assistant Examiners.*